United States Patent [19]

Ichinoi

[11] Patent Number: 4,635,120
[45] Date of Patent: Jan. 6, 1987

[54] NOISE REDUCTION CIRCUIT FOR VIDEO SIGNAL

[75] Inventor: Yutaka Ichinoi, Yokohama, Japan

[73] Assignee: Victor Company of Japan, Ltd., Yokohama, Japan

[21] Appl. No.: 754,628

[22] Filed: Jul. 12, 1985

[30] Foreign Application Priority Data

Jul. 13, 1984 [JP] Japan .................. 59-145691

[51] Int. Cl.$^4$ .................. H04N 5/213
[52] U.S. Cl. .................. 358/167; 358/36; 358/166
[58] Field of Search .......... 358/36, 166, 167, 340, 358/905; 455/303, 305, 306, 308; 375/102; 328/165; 307/542, 546, 547

[56] References Cited

U.S. PATENT DOCUMENTS

| | | | |
|---|---|---|---|
| 4,035,735 | 7/1977 | Akashi et al. | 455/305 |
| 4,434,438 | 2/1984 | Rzeszewski | 358/36 |
| 4,457,007 | 6/1984 | Gutleber | 328/165 |
| 4,459,700 | 7/1984 | Kretschmer, Jr. et al. | 328/165 |
| 4,563,704 | 1/1986 | Hirota | 358/167 |

Primary Examiner—James J. Groody
Assistant Examiner—Cynthia Smith
Attorney, Agent, or Firm—Michael N. Meller

[57] ABSTRACT

A noise reduction circuit for a video signal comprises a plurality of circuit parts coupled in series and a control circuit. Each of the circuit parts comprises a delay circuit for delaying an input video signal supplied thereto, a first subtracting circuit for subtracting an output signal of the delay circuit from the input video signal, a limiter circuit for limiting the amplitude of an output signal of the first subtracting circuit, and a second subtracting circuit for subtracting an output signal of the limiter circuit from the input video signal and for producing a signal which is reduced of a noise component within the input video signal. The delay circuit in each of the circuit parts has a different delay time in accordance with a kind of correlation existing in information contents of the input video signal. The control circuit comprises a plurality of detecting circuits provided in correspondence with the circuit parts and a control signal supplying circuit. Each of the detecting circuits is supplied with the output signal of the first subtracting circuit of a corresponding circuit part and detects large amplitude signal components thereof.

5 Claims, 7 Drawing Figures

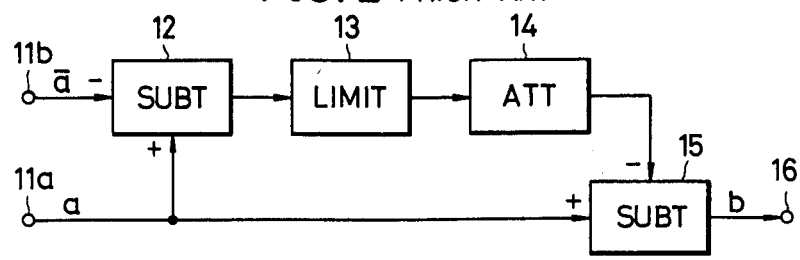
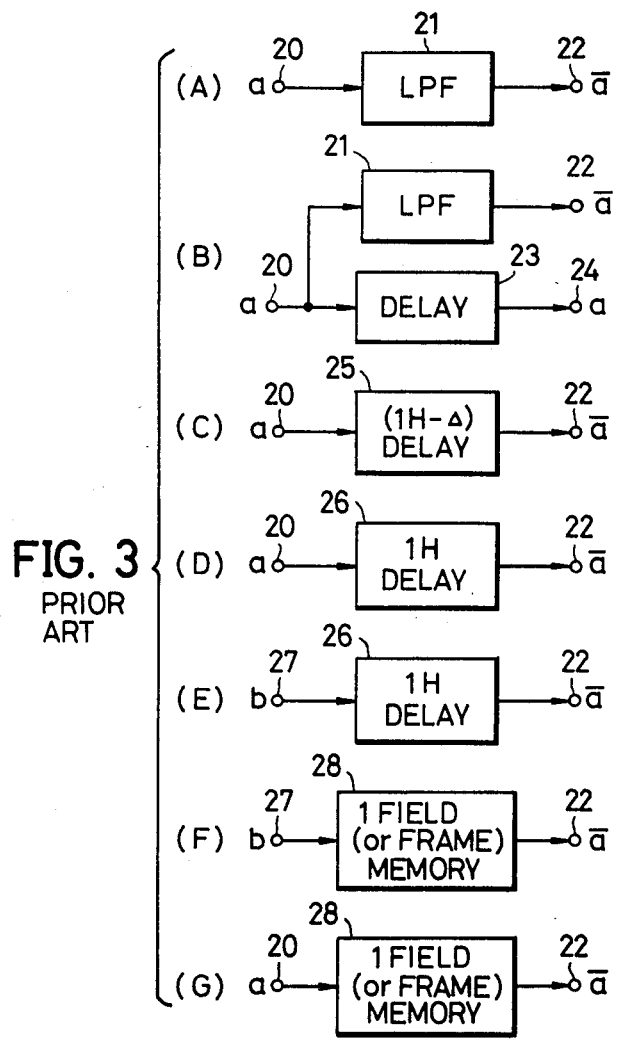

NOISE REDUCTION CIRCUIT FOR VIDEO SIGNAL

BACKGROUND OF THE INVENTION

The present invention generally relates to noise reduction circuits for video signals, and more particularly to a noise reduction circuit which can satisfactorily reduce a noise component in a video signal without introducing undesirable effects to a video signal component by using correlations in the video signal such as a correlation within a line, a correlation between lines, and a correlation between fields.

Conventionally, a noise component within a video signal is reduced in noise reduction circuits which use correlations such as a correlation within a line (hereinafter simply referred to as a within-line correlation), a correlation between lines (hereinafter simply referred to as a line correlation), and a correlation between fields (hereinafter simply referred to as a field correlation). The construction of the conventional noise reduction circuits will be described later on in the specification by referring to drawings. However, the conventional noise reduction circuits are constructed independently depending on the kind of correlation which is taken into account to reduce the noise component. Further, especially in the case where the video signal has no within-line correlation, no line correlation, and no field correlation, the pattern of the reproduced picture becomes deteriorated when the video signal is passed through a noise reduction circuit which uses one of the correlations in the video signal to reduce the noise component. For this reason, each of the conventional noise reduction circuits comprises an internal limiter circuit having a limiting level thereof selected to a low value to such an extent that no undesirable effects are introduced to the video signal. Accordingly, the conventional noise reduction circuits had a disadvantage in that a satisfactory noise reducing effect cannot be obtained. On the other hand, when the limiting level is increased to improve the noise reducing effect so that the signal-to-noise (S/N) ratio is improved, there is a problem in that the pattern of the reproduced picture becomes faded in the case where no correlation exists in the information contents of the video signal.

SUMMARY OF THE INVENTION

Accordingly, it is a general object of the present invention to provide a novel and useful noise reduction circuit for video signal, in which the disadvantages described heretofore are eliminated.

Another and more specific object of the present invention is to provide a noise reduction circuit comprising a plurality of different noise reduction circuits which use different correlations in a video signal and are coupled in series, wherein each interval between upper and lower limiting levels of the different noise reduction circuits is normally set to a small (narrow) value, but when the correlation in the video signal does not exist with respect to one of the different noise reduction circuits, each interval between the upper and lower limiting levels of the remaining different noise reduction circuits is variably controlled to a large (wide) value so that the remaining different noise reduction circuits reduce a noise component which could not be reduced in the one of the noise reduction circuits. According to the noise reduction circuit of the present invention, it is possible to effectively and satisfactorily reduce the noise component even in the case where a kind of correlation does not exist in the video signal, and more over, the pattern of the reproduced picture will not be deteriorated.

Other objects and features of the present invention will be apparent from the following detailed description when read in conjunction with the accompanying drawings.

BRIEF DESCRIPTION OF THE DRAWINGS

FIG. 2 is a system block diagram showing an essential part of a conventional noise reduction circuit;

FIGS. 3(A) through 3(G) are block diagrams respectively showing examples of essential parts of other noise reduction circuits which are coupled to the noise reduction circuit shown in FIG. 2;

DETAILED DESCRIPTION

Figure 1:
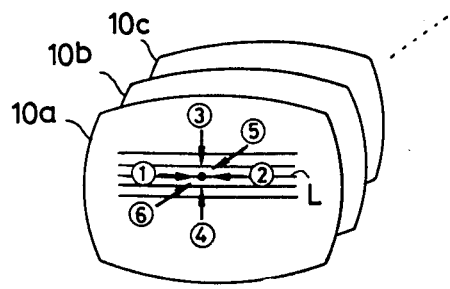
FIG. 1 is a diagram for explaining the correlations in the video signal.

Generally, correlations exist in the information contents of a video signal, and the correlations can be divided into the following kinds. That is, as shown in FIG. 1, the correlations in the video signal can be divided into (A) the case where a within-line correlation exists in a forward direction (direction in which the time progresses) indicated by an arrow ① with respect to a horizontal scanning line (hereinafter simply referred to as a line) L within a picture 10a (one field), (B) the case where a within-line correlation exists in a backward direction (direction opposite to the direction in which the time progresses) indicated by an arrow ② with respect to the line L within the picture 10a, (C) the case where a line correlation exists in a forward direction indicated by an arrow ③ within the picture 10a, (D) the case where a line correlation exists in a backward direction indicated by an arrow ④ within the picture 10a, (E) the case where a field correlation (or a frame correlation) exists in a forward direction indicated by an arrow ⑤ between the picture 10a and a previous picture 10b (or a picture 10c which is previous to the picture 10b), and the case where a field correlation (or a frame correlation) exists in a backward direction indicated by an arrow ⑥ between the picture 10a and a next picture (or a picture which is subsequent to the next picture).

The information contents of the video signal generally have one of the kinds of correlations described above, and it is uncommon for the information contents to have no such correlation. On the other hand, the correlation generally does not exist with respect to a noise component. Hence, in a noise reduction circuit which uses the correlation in the video signal in order to reduce the noise component, a subtraction between an input signal and a video signal which is relatively prior to or subsequent to the input video signal by a predetermined time period. As a result of such a subtraction, the video signal components are cancelled because the video signal components have the correlation, and the noise component having no correlation is obtained. A video signal which is eliminated of the noise component, is obtained by subtracting the noise component from the input video signal.

This noise reduction will now be described by referring to FIG. 2. FIG. 2 shows an essential part of the conventional noise reduction circuit. An input video signal $a$ is applied to an input terminal 11$a$, and a video signal $\bar{a}$ which will be described later is applied to an input terminal 11$b$. The video signal $\bar{a}$ is subtracted from the input video signal $a$ in a subtracting circuit 12. A noise component is obtained from the subtracting circuit 12 and is subjected to an amplitude limitation in a limiter 13. An output signal of the limiter 13 is attenuated by a predetermined quantity in an attenuator 14, and is supplied to a subtracting circuit 15. The subtracting circuit 15 subtracts an output signal of the attenuator 14 from the input video signal $a$, and a video signal $b$ which is eliminated of the noise component is obtained through an output terminal 16.

When using the within-line correlation in the forward direction described under the case (A) given before, an output terminal 22 of a circuit shown in FIG. 3(A) is coupled to the input terminal 11$b$. The input video signal $a$ applied to the input terminal 11$a$ is also applied to an input terminal 20. The input video signal $a$ is passed through a lowpass filter 21, and an output signal of the lowpass filter 21 is applied to the input terminal 11$b$ as the video signal $\bar{a}$, through an output terminal 22. A noise reduction circuit constituted by the circuits shown in FIGS. 2 and 3(A) is generally referred to as a coring circuit.

When using the within-line correlation in the backward direction described under the case (B), output terminals 22 and 24 of a circuit shown in FIG. 3(B) are, for example, coupled to the input terminals 11$b$ and 11$a$, respectively. The input video signal $a$ applied to the input terminal 20 is passed through the lowpass filter 21 on one hand, and is passed through a delay circuit 23 on the other. The output signal of the lowpass filter 21 is applied to the input terminal 11$b$ as the video signal $\bar{a}$, through the output terminal 22. An output signal of the delay circuit 22 is applied to the input terminal 11$a$ through the output terminal 24. A noise reduction circuit constituted by the circuits shown in FIGS. 2 and 3(B) is generally referred to as a backward type coring circuit.

A circuit shown in FIG. 3(C) is employed in a modification of the backward type coring circuit. The input video signal $a$ applied to the input terminal 20 is supplied to a (1$\bar{H}$ − $\Delta$) delay circuit 25, where $\underline{H}$ represents one horizontal scanning period. An output signal of the delay circuit 25 is applied to the input terminal 11$b$ through the output terminal 22.

When using the line correlation in the forward direction described under the case (C), the output terminal 22 of a circuit shown in FIG. 3(D) is coupled to the input terminal 11$b$. The input video signal $a$ applied to the input terminal 20 is passed through a 1$\bar{H}$ delay circuit 26 which delays the signal by a time period of 1$H$, and a delayed output signal of the 1H delay circuit 26 is applied to the input terminal 11$b$ through the output terminal 22. A noise reduction circuit constituted by the circuits shown in FIGS. 2 and 3(D) is generally referred to as a noise canceller using line correlation.

On the other hand, as another example of the use of the line correlation in the forward direction, a circuit shown in FIG. 3(E) is employed. The output signal $\underline{b}$ of the subtracting circuit 15 shown in FIG. 2 is applied to an input terminal 27, and is passed through the 1H delay circuit 26. The output signal of the 1H delay circuit 26 is passed through the output terminal 22 and is applied to the input terminal 11$b$. A noise reduction circuit constituted by the circuits shown in FIGS. 2 and 3(E) is generally referred to as a recursive type noise canceller using line correlation.

When using the field (or frame) correlation in the forward direction described under the case (E), a circuit shown in FIG. 3(F) is employed. The output signal of the subtracting circuit 15 shown in FIG. 2 is applied to an input terminal 27, and is passed through a one field (or one frame) memory 28 wherein the signal is delayed by one field (or one frame). An output signal of the one field (or one frame) memory 28 is applied to the input terminal 11$b$ through the output terminal 22. A noise reduction circuit constituted by the circuits shown in FIGS. 2 and 3(F) is generally referred to as a recursive type noise canceller using field (or frame) correlation.

As another example, it is possible to employ a circuit shown in FIG. 3(G), and in this case, the input video signal $a$ applied to the input terminal 20 is passed through the one field (or one frame) memory 28 and the output terminal 22 and is applied to the input terminal 11$b$.

The conventional noise reduction circuit uses one of the noise reduction circuits described heretofore, independently, and this lead to the disadvantages described before.

The present invention has eliminated the disadvantages of the conventional circuits described before, and an embodiment of the noise reduction circuit according to the present invention will now be described by referring to FIG. 4 and the figures which follow.

Figure 4:
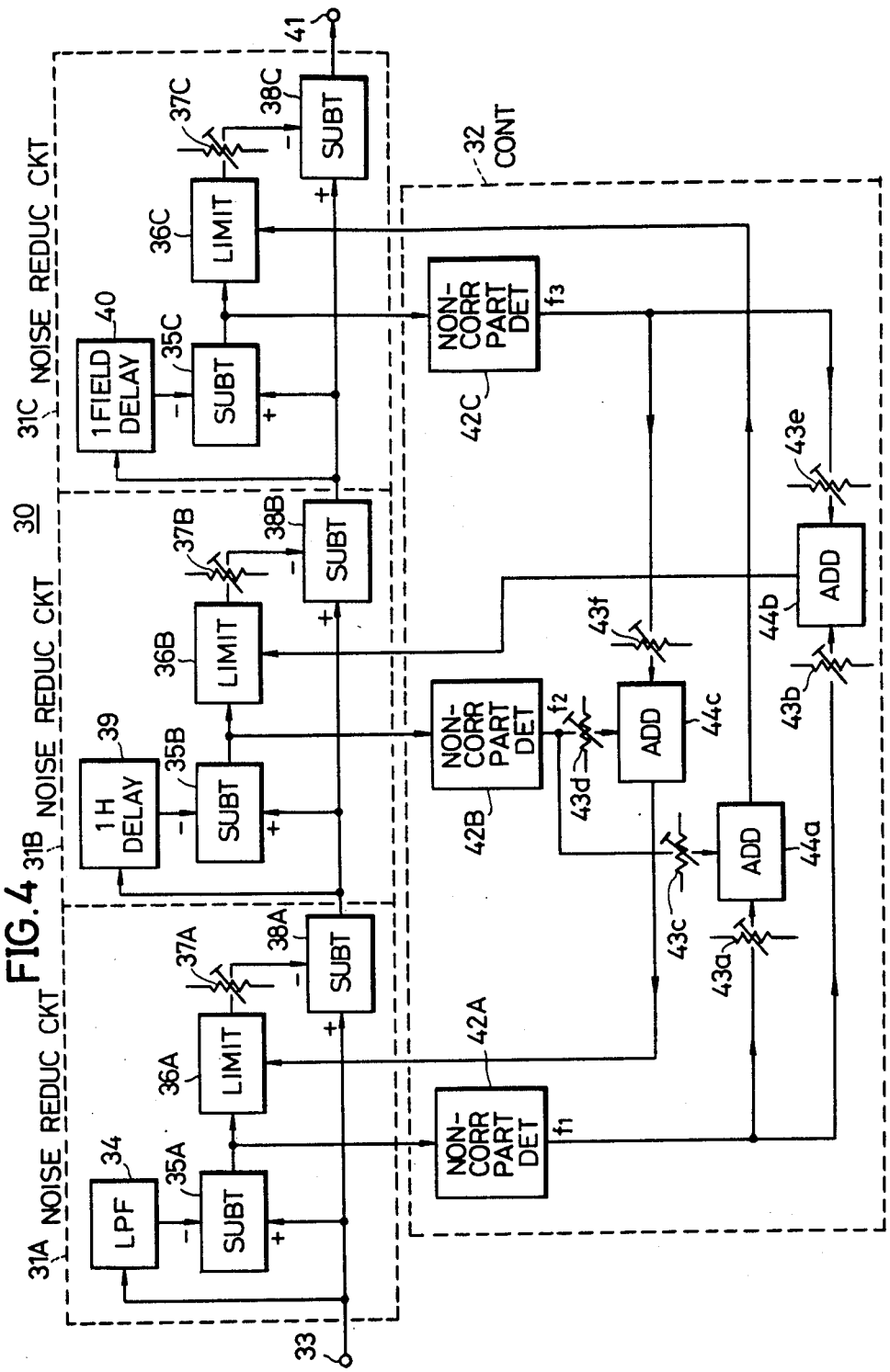
FIG. 4 is a system block diagram showing an embodiment of a noise reduction circuit according to the present invention.

In the embodiment shown in FIG. 4, a noise reduction circuit 30 generally comprises a noise reduction circuit part 31A which uses the within-line correlation, a noise reduction circuit part 31B which uses the line correlation, a noise reduction circuit part 31C which uses the field correlation, and a control circuit part 32.

An input video signal which includes a noise component which is to be eliminated, is applied to an input terminal 33. The input video signal is supplied to a lowpass filter 34 and subtracting circuits 35A and 38A within the noise reduction circuit part 31A. An output signal of the lowpass filter 34 is supplied to the subtracting circuit 35A and is subtracted from the input video signal from the input terminal 33. Hence, the noise component is obtained from the subtracting circuit 35A. An output signal of the subtracting circuit 35A is supplied to a non-correlated part detecting circuit 42A within the control circuit part 32 which will be described later and a limiter circuit 36A which will be described later. A signal which is amplitude-limited in the limiter circuit 36A is passed through an attenuator 37A and is supplied to the subtracting circuit 38A wherein an output signal of the attenuator 37A is subtracted from the input video signal from the input terminal 33. Accordingly, a video signal which is eliminated of the noise component to a certain extent is obtained from the subtracting circuit 38A.

The output signal of the subtracting circuit 38A is supplied to a 1H delay circuit 39 and subtracting circuits 35B and 38B within the noise reduction circuit part 31B. The signal which is delayed by one horizontal scanning period (1H) in the 1H delay circuit 39 is subtracted from the output signal of the subtracting circuit 38A in the subtracting circuit 35B. An output signal of the subtracting circuit 35B is supplied to a non-correlated part detecting circuit 42B within the control circuit part 32 and a limiter circuit 36B. Because the operations of the subtracting circuits 35B and 38B, the limiter circuit 36B, and an attenuator 37B are the same as those of the subtracting circuits 35A and 38A, the limiter circuit 36A, and the attenuator 37A, these circuit elements are designated by the same reference numerals as those of the corresponding circuit elements of the noise reduction circuit part 31A with a subscript "B" instead of "A" and description thereof will be omitted.

The output signal of the subtracting circuit 38B is supplied to a one field delay circuit 40 and subtracting circuits 35C and 38C within the noise reduction circuit part 31C. The signal which is delayed by one field in the one field delay circuit 40 is subtracted from the output signal of the subtracting circuit 38B in the subtracting circuit 35C. An output signal of the subtracting circuit 35C is supplied to a non-correlated part detecting circuit 42C within the control circuit part 32 and a limiter circuit 36C. Because the operations of the subtracting circuits 35C and 38C, the limiter circuit 36C, and an attenuator 37C are the same as those of the subtracting circuits 35A and 38A, the limiter circuit 36A, and the attenuator 37A, these circuit elements are designated by the same reference numerals as those of the corresponding circuit elements of the noise reduction circuit part 31A with a subscript "C" instead of "A" and description thereof will be omitted. An output video signal of the subtracting circuit 38C, which is eliminated of the noise component, is obtained through an output terminal 41.

In the case where the noise reduction circuit part 31C is to be constituted by a noise reduction circuit part using the frame correlation, a one frame delay circuit is used instead of the one field delay circuit 40. In addition, a noise reduction circuit which uses the frame correlation and is constructed in this manner, may be coupled in series with the noise reduction circuit part 31C. Further, the circuit shown in FIG. 3(B) or FIG. 3(C) may be used instead of the lowpass filter 34 within the noise reduction circuit part 31A, the circuit shown in FIG. 3(E) may be used instead of the 1H delay circuit 39 within the noise reduction circuit part 31B, and the circuit shown in FIG. 3(F) may be used instead of the one field delay circuit 40 within the noise reduction circuit part 31C.

Figure 5:
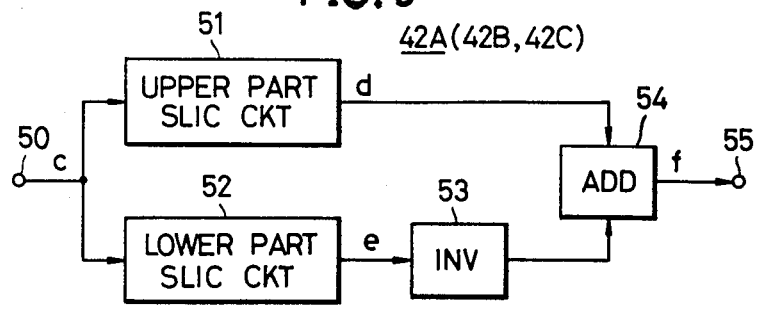
FIG. 5 is a system block diagram showing an embodiment of a non-correlated part detecting circuit within the block system shown in FIG. 4.
Figure 6:
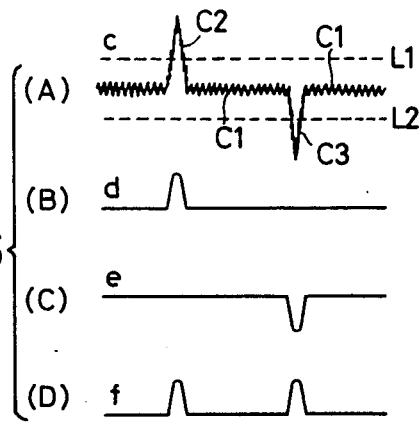
FIGS. 6(A) through 6(D) show signal waveforms at parts of the block system shown in FIG. 5.

FIG. 5 shows an embodiment of a concrete circuit construction of the non-correlated part detecting circuit 42A. Because the constructions of the non-correlated part detecting circuits 42B and 42C are the same as that of the non-correlated part detecting circuit 42A, description and illustration thereof will be omitted. An output signal c of the subtracting circuit 35A is applied to a terminal 50 and is supplied to an upper part slicing circuit 51 and a lower part slicing circuit 52. In the case where the within-line correlation exists in the two signals supplied to the subtracting circuit 35A, the video signal components in the two signals cancel each other, but the noise components in the two signals are not cancelled since the within-line correlation does not exist with respect to the noise component. Thus, a noise component $c_1$ shown in FIG. 6(A) is obtained from the subtracting circuit 35A. On the other hand, even with respect to the video signal component, the within-line correlation does not exist at parts where the information content changes from black to white or white to black in the horizontal scanning direction. As a result, large amplitude signal components $c_2$ and $c_3$ shown in FIG. 6(A) are also obtained from the subtracting circuit 35A in correspondence with the parts of the video signal component having no within-line correlation. In the case where the information content of the video signal component gradually changes from black to white (or white to black), for example, the correlation does not exist during the change, and a large amplitude signal component having a large width is produced although the amplitude thereof is slightly smaller than those of the components $c_2$ and $c_3$.

The signal c comprising the signal components $c_1$, $c_2$, and $c_3$ is supplied to the upper part slicing circuit 51 wherein a signal part over a predetermined slicing level L1 is sliced. In other words, the upper part slicing circuit 51 removes the signal part over the level L1 of the large amplitude signal component $c_2$. Accordingly, a signal d shown in FIG. 6(B) is obtained from the upper part slicing circuit 51 and is supplied to an adding circuit 54. The signal c is also supplied to a lower part slicing circuit 52 wherein a signal part under a predetermined slicing level L2 is sliced. That is, the lower part slicing circuit 52 removes the signal part under the level L2 of the large amplitude signal component $c_3$. Thus, a signal e shown in FIG. 6(C) is obtained from the lower part slicing circuit 52 and is supplied to an inverting circuit 53 wherein the signal e is inverted. An output signal of the inverting circuit 53 is supplied to the adding circuit 53 and is added with the signal d. As a result, a signal f shown in FIG. 6(D) is produced from the adding circuit 54 and is obtained through a terminal 55. The signal f obtained through the terminal 55 is produced from the non-correlated part detecting circuit 42A as a detection signal f1. The detection signal f1 is supplied to an adding circuit 44a through an attenuator 43a on one hand, and is supplied to an adding circuit 44b through an attenuator 43b on the other.

Similarly, a detection signal f2 is obtained from the non-correlated part detecting circuit 42B in correspondence with a part of the video signal having no line correlation. The detection signal f2 is supplied to the adding circuit 44a through an attenuator 43c on one hand, and is supplied to an adding circuit 44c through an attenuator 43d. Similarly, a detection signal f3 is obtained from the non-correlated part detecting circuit 42C in correspondence with a part of the video signal having no field correlation. The detection signal f3 is supplied to the adding circuit 44b through an attenuator 43e on one hand, and is supplied to the adding circuit 44c through an attenuator 43f.

When each interval between the upper and lower limiting levels of the respective limiter circuits 36A through 36C of the respective noise reduction circuit parts 31A through 31C is wide (that is, when each interval between upper and lower limiting levels of the respective amplitude limitations is large), the output noise components of the subtracting circuits 35A through 35C are all supplied to the subtracting circuits 38A through 38C, and the noise reducing effect is large. However, when the large amplitude signal components $c_2$ and $c_3$ shown in FIG. 6(A) are also supplied to the subtracting circuits 38A through 38C, the video signals obtained from the subtracting circuits 38A through 38C are subjected to unnecessary subtractions, and the pattern of the reproduced picture becomes greatly deteriorated in that the contours of the images become faded. On the other hand, when the large amplitude signal components c2 and c3 are eliminated in the limiter circuits 36A through 36C, the noise components included in the large amplitude signal components c2 and c3 are also eliminated, and there is a problem in that the noise components in the corresponding signal parts cannot be eliminated in the subtracting circuits 38A through 38C.

Accordingly, in the noise reduction circuit of the present invention, each interval between the upper and lower limiting levels of the respective limiter circuits 36A through 36C is selected to a value which is narrow (small) to such an extent that there is constantly no deterioration in the pattern of the reproduced picture. Thus, in the case where the within-line correlation, the line correlation, and the field correlation exist in the information contents of the video signal, the noise reduction can be carried out effectively without deteriorating the pattern of the reproduced picture.

However, in the case where the within-line correlation does not exist in the information contents of the video signal, the pattern of the reproduced picture will not be deteriorated because of the narrow interval between the upper and lower limiting levels of the limiter circuit 36A, but the noise component cannot be sufficiently eliminated in the noise reduction circuit part 31A. In this case, the detection signal f1 described before is produced from the non-correlated part detecting circuit 42A in the noise reduction circuit of the present invention. This detection signal f1 is passed through the attenuator 43a and the adding circuit 44a, and is supplied to the limiter circuit 36C of the noise reduction circuit part 31C as a control signal. On the other hand, the detection signal f1 is passed through the attenuator 43b and the adding circuit 44b, and is supplied to the limiter circuit 36B of the noise reduction circuit part 31B as a control signal. When the limiter circuits 36C and 36B are supplied with the control signals from the respective adding circuits 44a and 44b, the interval between the upper and lower limiting levels of each of the limiter circuits 36C and 36B is slightly widened (enlarged) during the time period in which the corresponding control signal exists. Generally, even when the information contents of the video signal have no within-line correlation, at least one of the line correlation and the field correlation exists. In other words, it is uncommon for the information contents of the video signal to have none of the within-line correlation, the line correlation, and the field correlation. Accordingly, even in the case described above where the within-line correlation does not exist and the noise component cannot be sufficiently reduced in the noise reduction circuit part 31A, the remaining noise component is effectively reduced in the noise reduction circuit parts 31B and 31C respectively comprising the limiter circuits 36B and 36C each having the widened interval between the upper and lower limiting levels, without fading the pattern of the reproduced picture.

Similarly, in the case where the line correlation does not exist in the information contents of the video signal, the detection signal f2 is produced from the non-correlated part detecting circuit 42B. This detection signal f2 is passed through the attenuator 43c and the adding circuit 44a, and is supplied to the limiter circuit 36C of the noise reduction circuit part 31C as a control signal. On the other hand, the detection signal f2 is passed through the attenuator 43d and the adding circuit 44c, and is supplied to the limiter circuit 36A of the noise reduction circuit part 31A as a control signal. When the limiter circuits 36C and 36A are supplied with the control signals from the respective adding circuits 44a and 44c, the interval between the upper and lower limiting levels of each of the limiter circuits 36C and 36A is slightly widened (enlarged) during the time period in which the corresponding control signal exists.

Figure 7:
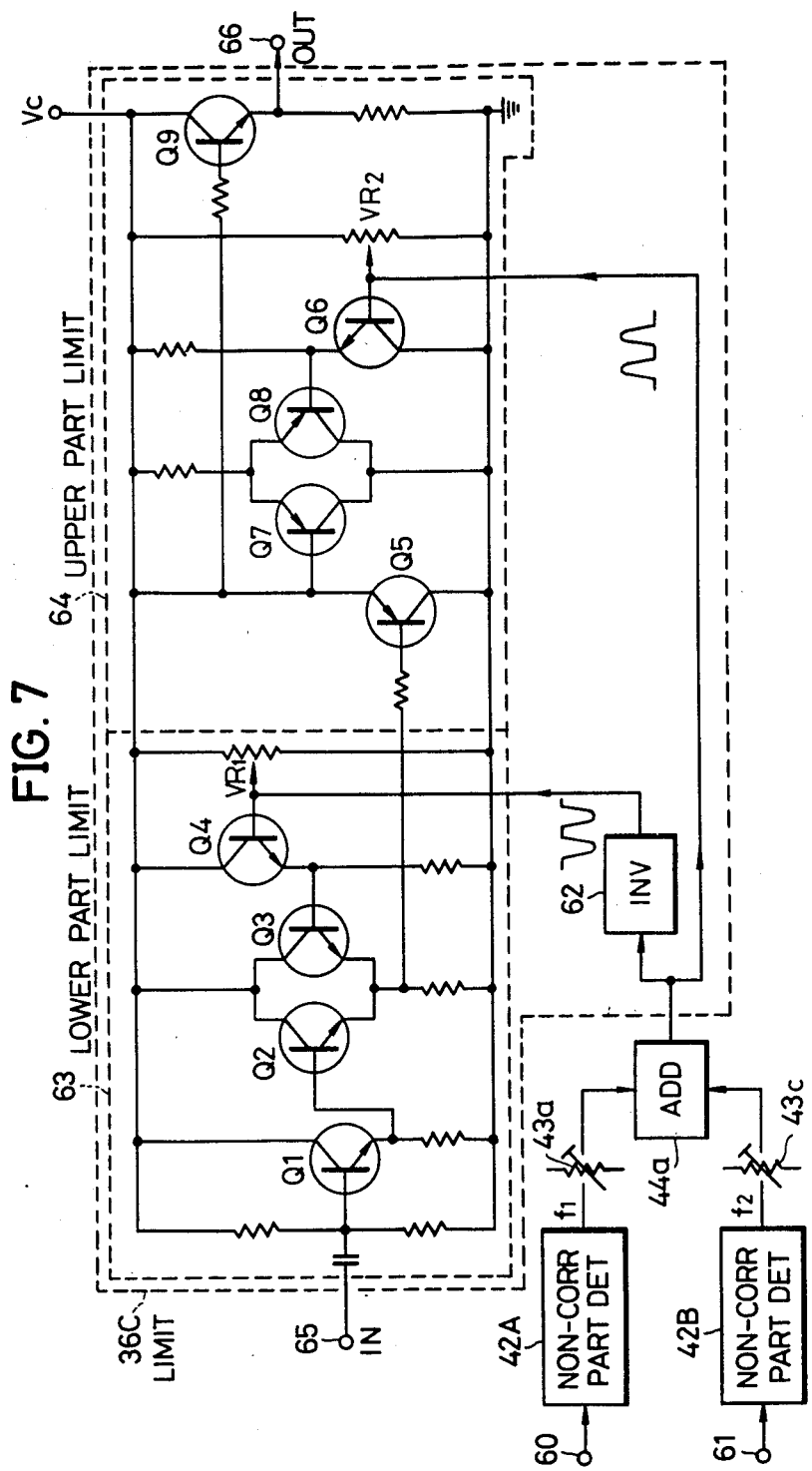
FIG. 7 is a system circuit diagram showing a concrete circuit of a part of the block system shown in FIG. 4.

Next, a description will be given with respect to an embodiment of a concrete circuit construction of the limiter circuit 36C by referring to FIG. 7. Because the circuit constructions of the limiter circuits 36A and 36B are similar to that of the limiter circuit 36C, description and illustration thereof will be omitted. The signal from the subtracting circuit 35A is applied to a terminal 60 and is supplied to the non-correlated part detecting circuit 42A. The signal from the subtracting circuit 35B is applied to a terminal 61 and is supplied to a non-correlated part detecting circuit 42B. The output detection signals f1 and f2 of the non-correlated part detecting circuits 42A and 42B are passed through the respective attenuators 43a and 43c, and are added in the adding circuit 44a. The output signal of the adding circuit 44a is applied to the base of a transistor Q6 of an upper part limiter circuit part 64 within the limiter circuit 36C. The upper part limiter circuit part 64 comprises transistors Q5 through Q9 and a variable resistor VR2. The variable resistor VR2 is provided for the setting of the upper limiting level, and a slider of the variable resistor VR2 is coupled to the base of the transistor Q6.

On the other hand, the output signal of the adding circuit 44a is inverted in an inverting circuit 62 and is applied to the base of a transistor Q4 of a lower part limiter circuit part 63. The lower part limiter circuit part 63 comprises transistors Q1 through Q4 and a variable resistor VR1. The variable resistor VR1 is provided for the setting of the lower limiting level, and a slider of the variable resistor VR1 is coupled to the base of the transistor Q4. The output signal of the subtracting circuit 35C is applied to an input terminal 65, and a signal obtained through an output terminal 66 is supplied to the subtracting circuit 38C through the attenuator 37C.

When no output signal is obtained from the adding circuit 44a, the upper part limiter circuit part 64 limits the upper part of the amplitude of the signal passing through the circuit part 64 with the upper limiting level set by the variable resistor VR2. On the other hand, lower part limiter circuit part 63 limits the lower part of the amplitude of the signal passing through the circuit part 63 with the lower limiting level set by the variable resistor VR1.

In the case where an output signal of the adding circuit 44a exists, a positive polarity signal thereof is applied to the base of the transistor Q6, and the upper limiting level of the upper part limiter circuit part 64 rises in the upper part. At the same time, a negative polarity signal from the inverting circuit 62 is applied to the base of the transistor Q4, and the lower limiting level of the lower part limiter circuit part 63 falls in the lower part. Accordingly, when the output signal of the adding circuit 44a exists, the interval between the upper and lower limiting levels of the limiter circuit 36C comprising the upper and lower part limiter circuit parts 64 and 63 is widened.

Further, the present invention is not limited to these embodiments, but various variations and modifications may be made without departing from the scope of the present invention.

What is claimed is:

1. A noise reduction circuit for a video signal, said noise reduction circuit comprising:
   a plurality of noise reduction circuit parts coupled in series, each of said plurality of noise reduction circuit parts comprising a delay circuit for delaying an input video signal supplied thereto, a first subtracting circuit for subtracting an output signal of said delay circuit from said input video signal, a limiter circuit for limiting the amplitude of an output signal of said first subtracting circuit, and a second subtracting circuit for subtracting an output signal of said limiter circuit from said input video signal and for producing a signal which is reduced of a noise component within said input video signal, said delay circuit in each of said plurality of noise reduction circuit parts having a different delay time in accordance with a kind of correlation existing in information contents of said input video signal; and
   a control circuit comprising a plurality of detecting circuits provided in correspondence with said plurality of noise reduction circuit parts and a control signal supplying circuit, each of said plurality of detecting circuits being supplied with the output signal of said first subtracting circuit of a corresponding noise reduction circuit part and detecting large amplitude signal components thereof, said control signal supplying circuit supplying the output signal of said detecting circuit as a control signal to the limiter circuits of the noise reduction circuit parts other than said corresponding noise reduction circuit part,
   said limiter circuit in each of said noise reduction circuit parts having an interval between upper and lower limiting levels thereof set to a relatively small predetermined interval, said interval of said limiter circuit in each of said noise reduction circuit parts being widened during a time period in which said control signal is supplied thereto from said control circuit.

2. A noise reduction circuit as claimed in claim 1 in which each of said plurality of detecting circuits comprises a first circuit for slicing an upper large amplitude part of the output signal of said first subtracting circuit, a second circuit for slicing a lower large amplitude part of the output signal of said first subtracting circuit and for inverting the sliced signal, and a circuit for adding output signals of said first and second circuits so as to produce a detection signal.

3. A noise reduction circuit as claimed in claim 1 in which said plurality of noise reduction circuit parts comprise first, second and third noise reduction circuit parts, said first noise reduction circuit part comprising the delay circuit which is constituted by a lowpass filter, said second noise reduction circuit part comprising the delay circuit which is constituted by a one horizontal scanning period delay circuit, said third noise reduction circuit part comprising the delay circuit which is constituted by a one field delay circuit, said plurality of detecting circuits comprising first, second, and third detecting circuits, each of said first, second, and third detecting circuits being supplied with the output signal of said first subtracting circuit in a corresponding one of said first, second, and third noise reduction circuit parts, said control signal supplying circuit comprising a circuit for adding output signals of said first and second detecting circuits and for supplying an output signal to the limiter circuit of said third noise reduction circuit part, a circuit for adding output signals of said first and third detecting circuits and for supplying an output signal to the limiter circuit of said second noise reduction circuit part, and a circuit for adding the output signals of said second and third detecting circuits and for supplying an output signal to the limiter circuit of said first noise reduction circuit part.

4. A noise reduction circuit as claimed in claim 1 in which said limiter circuit comprises an upper part limiter circuit part for limiting an upper part of the amplitude of the output signal of said first subtracting circuit, a lower part limiter circuit part for limiting a lower part of the amplitude of the output signal of said first subtracting circuit, and an inverting circuit for inverting the control signal from said control signal supplying circuit, said upper part limiter circuit part being raised of an upper limiting level thereof responsive to the control signal from said control signal supplying circuit and said lower part limiter circuit part being lowered of a lower limiting level thereof responsive to a signal from said inverting circuit so as to widen an interval between the upper and lower limiting levels.

5. A noise reduction circuit as claimed in claim 4 in which said upper part limiter circuit part comprises a first variable resistor for setting the upper limiting level for a case where said control signal is not supplied to said upper part limiter circuit part, and a circuit including a first transistor having a base thereof coupled to said first variable resistor, said base of said first transistor being applied with said control signal, said lower part limiter circuit part comprising a second variable resistor for setting the lower limiting level for a case where said control signal is not supplied to said lower part limiter circuit part, and a circuit including a second transistor having a base thereof coupled to said second variable resistor, said base of said second transistor being applied with the signal from said inverting circuit.

* * * * *